Jan. 19, 1932.  A. O. SCHAEFER  1,841,455
METHOD OF MAKING SAWS
Filed Nov. 6, 1930  2 Sheets-Sheet 1

Inventor:
Adolph O. Schaefer,
By Parker Burt Atty.

Jan. 19, 1932.  A. O. SCHAEFER  1,841,455
METHOD OF MAKING SAWS
Filed Nov. 6, 1930  2 Sheets-Sheet 2

Inventor:
Adolph O. Schaefer,
By Parker Carr Atty.

Patented Jan. 19, 1932

1,841,455

UNITED STATES PATENT OFFICE

ADOLPH O. SCHAEFER, OF BROOKLYN, NEW YORK, ASSIGNOR TO ATLANTIC SERVICE COMPANY, INC., OF BROOKLYN, NEW YORK, A CORPORATION OF NEW YORK

METHOD OF MAKING SAWS

Application filed November 6, 1930. Serial No. 493,860.

My invention relates to new and useful improvements in saws and the method of making the same, and more particularly to a saw that is used in the meat industry, such as for cutting animal carcasses.

One of the principal objects of the invention is to provide a saw with a wave line in the teeth as, for some reason, this makes a better and faster cutting saw or, as expressed in the trade, has a better "feel".

Still another object of the invention is to provide a saw with a wave line in the teeth, and to also so construct the saw that this same wave line will be absolutely retained, no matter how often the saw is resharpened.

As is well known to those skilled in the art, saws of this nature may be provided with a wave line in the teeth but many difficulties are encountered when the saw is refiled, as there is no practical means for guiding the saw through a refiling machine that will cause the refiling action to accurately follow the wave line of the saw.

As is also well known, there have been machines made wherein two height stops are set in the machine and the vise friction removed while the blade is moved forward one tooth, as during this period the blade should be entirely free to readjust itself for another filing stroke. This has not been practical, as is has been impossible to maintain the correct working conditions of the vise. The height rollers also have a tendency to create a dull condition on the sharpened saw teeth and any heretofore used gauge would not do the work accurately.

One of the present objects, therefore, is to provide a wave line in the teeth and to provide a similarly formed wave line on the rear edge of the saw, so that when the saw is made and afterwards sent back for refiling, the rear edge of the saw acts as a standard or gauge and the filing will be duplicated on each toothed edge for all times, no matter how often the blade is refiled.

Still another object of the invention is to provide a saw of the narrow band type that may be cut from stock into any desired length, and wherein the saw is so constructed that when necessary to resharpen the same, it may be set in a filing machine and the gauge or wave line of the back of the saw will cause the saw to travel through the machine in exactly the same manner as when it was first filed. Thus, it may be properly sharpened without in any way destroying or changing the former wave line in the teeth.

Still another object of the invention is to provide a new method for taking the ribbon stock, out of which the saw is to be made and feed it through a machine that will tightly clamp the same, so that there will be no possibility of slippage and while it is so held to grind or otherwise form on the rear edge of the saw the wave or pitch line, thus forming a corresponding wave or pitch line when punching the teeth. After this step, the saw using the same wave line for a gauge will have its teeth set, after which the saw will be run through a sharpening machine, and still using the same wave line or gauge on the rear of the saw, the teeth may be quickly and accurately filed and may again be accurately refiled at any time by still using the rear wave line as a gauge.

Still another object of the invention is to provide a saw with the wave line in the teeth and also duplicated on the rear edge of the saw, so that the saw may be quickly refiled, whenever necessary, and the original wave line of the teeth still adhered to.

With these and other objects in view, the invention consists in certain new and novel steps in the making of the same and in certain new and novel arrangements of the parts of the saw, as will be hereinafter more fully explained and pointed out in the claims.

Referring now to the drawings showing the saw and also diagrammatically showing one way of carrying out the method of making and setting and resharpening the saw, Fig. 1 is a view of my improved saw, the scale, however, being double that of the actual saw and the wave exaggerated in depth for the sake of clearness of illustration;

Figure 2:
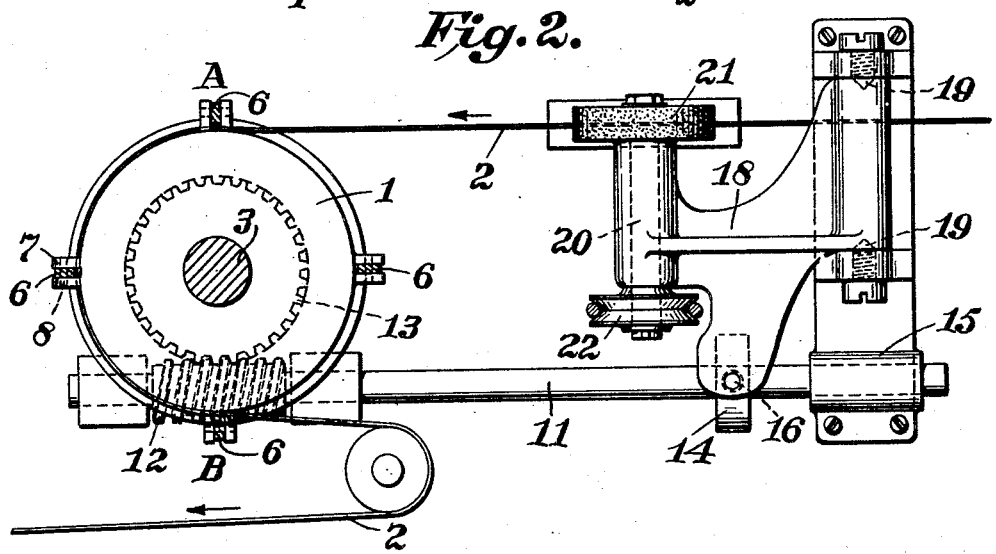
Fig. 2 is a top plan view showing a drum over which the ribbon stock is to be turned, so that the wave line may be ground in the rear edge of the saw.
Figure 3:
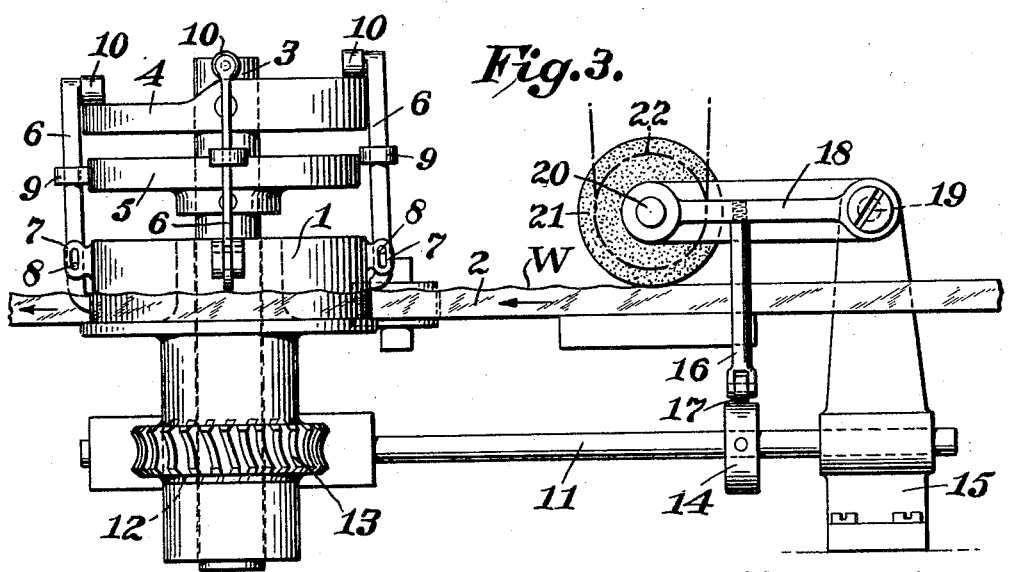
Fig. 3 is a view similar to that of Fig. 2 but showing diagrammatically a side elevation of a part of the machine for feeding the ribbon stock and grinding the wave in the saw.

Referring now more particularly to the several views and for the moment to Figs. 2 and 3, there is diagrammatically shown a drum 1 over which the ribbon stock 2 is to be fed. It will be understood that by ribbon stock is meant the narrow steel band out of which the saw is to be formed.

The drum 1 is revolvably mounted on a stationary shaft 3 on which there is fixedly mounted a face cam 4 and a peripheral cam 5.

Of course, power is to be applied to revolve the drum, and as this may be done in any conventional manner it is only diagrammatically outlined.

As also may be noticed, there are four fingers 6 which are mounted on the drum, and a description of one will be a description of all.

Now, there is a small slotted lug on the drum 7 in which moves a pin 8, which is a part of the finger 6. There is a roller 9 also mounted on the finger, which is to be operated by the peripheral cam 5, while a further roller 10 is to be operated by the face cam 4.

Now as the drum revolves, it will be seen that the several fingers 6 will drop downwardly and then their lower ends will also be forced inwardly, the latter action being caused by the action of the cam 5, so that as the stock 2 passes around the drum it will always be tightly clamped, say between the points A and B on the drum, so that there is no chance whatever for the stock to slip while having the wave line formed on its rear upper edge.

It will be seen that by providing a drum of this construction, the fingers are not in the path of the stock until the stock has reached a certain point on the drum, nor are they in the path of the stock as it leaves the drum, as the upper face cam 4 properly retracts or allows the fingers to fall at the desired intervals of time.

It is necessary to prevent any slippage in the stock during the grinding or forming of the wave line, as the wave line on the rear edge must be synchronized with the linear feet of ribbon or, in other words, the correct relation must be maintained.

It will also be understood that the drum I have shown is one way of preventing slippage, but any other convenient mechanism to prevent slippage might be utilized.

Still referring to Figs. 2 and 3, there will be seen a cam shaft 11 with the worm 12 thereon that will mesh with a gear 13 on the drum, the cam 14 being mounted near a standard 15. There is also a cam rod 16 with a roller 17 thereon to contact with the cam 14, which rod, in turn, is connected to the short stub arm 18 which is pivotally mounted, as at 19, and has a shaft 20 therein, on which is mounted the grinding wheel 21.

I have shown a pulley 22 on the other end of the shaft 20, to which a belt may be fastened for driving this grinding wheel at a high rate of speed.

Thus, it will be seen that the rotation of the drum 1 and the traveling of the saw will be synchronized with the oscillations of the grinding wheel, so that this wave line may be accurately ground into the rear edge of the band as the band is fed.

The pitch of this wave is thus held to a standard in relation to the linear feet of the saw steel or ribbon stock.

The pitch or wave that I have found to be most desirable is three-quarters of one inch or, in other words, three-quarters of an inch from crest to crest. Thus, four feet of steel would contain exactly sixty-four waves.

It will be understood that this exact condition has no particular effects on the cutting qualities of the blade, as far as the exact number of waves are concerned, but its perfection solves the future steps, such as the refiling and setting of the blades.

As far as the specification has proceeded, it will be seen that the use of the drum as set forth allows the ribbon to lay itself upon the periphery and also allows the ribbon to leave the drum unhindered and, at the same time, tightly clamps the stock in position and permits the grinding wheel to grind the desired wave correctly in the rear edge of the ribbon stock.

Figure 4:
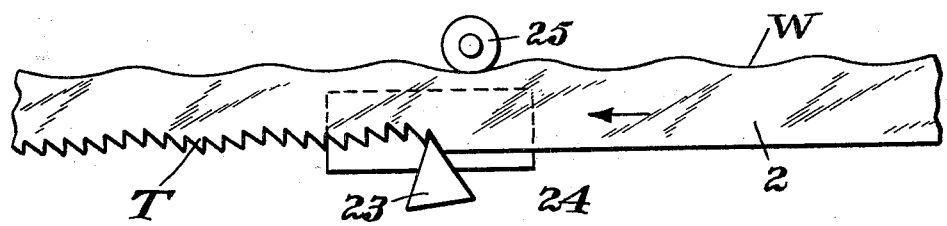
Fig. 4 is a diagrammatic view showing the ribbon stock and the punch and die for forming teeth in the saw, and also showing the stationary roller for contacting with the rear edge of the saw which forms a guide or standard for the punch for cutting the said teeth.

Referring now for the moment to Fig. 4, there is diagrammatically shown the manner of punching the teeth T in the ribbon stock.

There is shown the conventional punch 23 and a die 24, but instead of having a straight flat guide backing up the stock that is being cut, there is shown the small roller 25 along which the waved edge W of the stock rides. This causes the stock to move up and down in the die and thereby reproduces the exact wave in the toothed edge, as has already been formed in the untoothed or upper edge of the stock.

Figure 5:
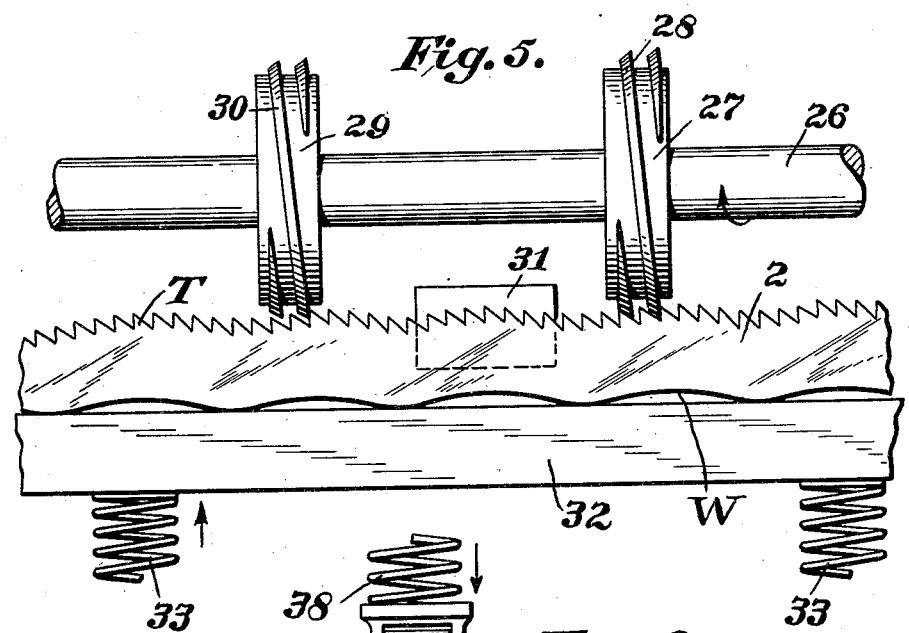
Fig. 5 is a diagrammatic view showing the manner of passing the saw through the setting anvil.

The next operation is the setting operation, and in Fig. 5 I have diagrammatically shown a shaft 26, on which there is the stop or wheel 27 with its helix 28 and a similar wheel 29 with its helix 30. The distance between these wheels is the exact multiples of the wave pitch. For instance, if the wave pitch is three-quarters of an inch, the distance between the two stops or wheels with their helices would be say one and one-half or two and one-quarter inches. This causes the stock and the saw teeth to move up and down in a parallel motion and not a see-saw motion, so that the teeth are always presented in the same relation to the setting anvils 31 and a hammer or hammers (not shown).

There will be seen a support 32 under the stock, which is spring-pressed, as by the springs 33, so that the stock may move up and down but, at the same time, will always be held in engagement with the helices and thus properly presented to the setting anvils and hammer. It will likewise be understood here that other forms of mechanism might be used to provide a tooth by tooth movement.

The great advantage of the pitch line or wave line in the rear of the saw is for the operation which is next to be described, that is, the filing or refiling.

Figure 6:
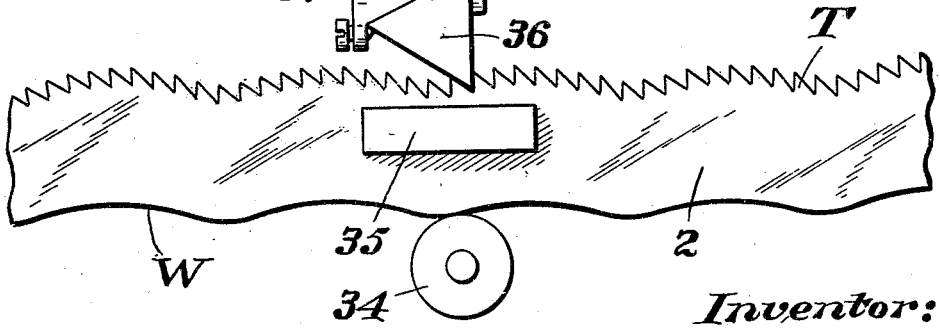
Fig. 6 diagrammatically shows the manner of sharpening the teeth or refiling the saw after the wave has been applied.

In Fig. 6, there is shown in an exaggerated manner the ribbon stock 2 with the teeth T cut therein in a wave-like manner, while the rear edge of the band has a similar wave W formed therein. There is also diagrammatically shown a stationary roller 34 over which will ride the wave W of the saw or ribbon stock 2, while a vise 35 is illustrated for clamping the saw from moving laterally.

Directly over the vise is shown the file 36 which may be conventionally mounted in a carrier 37, which carrier is spring-pressed by the spring 38, and it is, of course, known that this file travels laterally, that is, at right angles to the length of the saw, and power means will be used for the movement of the file.

Now as the stock is fed over the roller, the same will move upwardly and downwardly, as the crests and troughs ride over the stationary roller and, at the same time, the vise permits the saw or ribbon to travel forwardly but will not let the same move laterally, which is, of course, a great advantage over the former methods of sharpening the teeth. Heretofore, it was necessary, for instance, to remove the vise friction while the blade was moved forward one tooth, as the blade should not be forced downwardly by the file pressure. Furthermore, it was nearly impossible to maintain the correct condition of the vise. It was also impossible to maintain the certain standard desired.

However, with the saw formed as above illustrated, the stationary roller will cause the stock to move upwardly and downwardly in the vise and, at the same time, permit the stock to feed forwardly and of course allow the file to follow the wave motion that has been previously ground into the stock.

Figure 1:
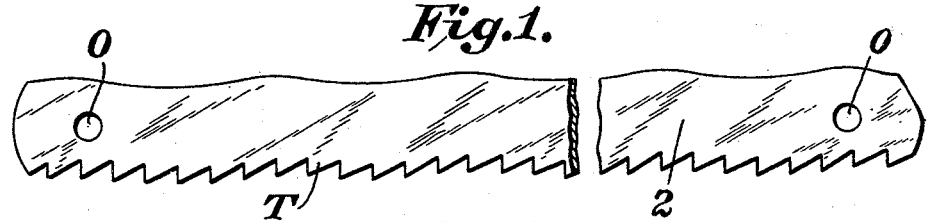

In the same manner, it will be seen what an easy matter it is to refile a saw or resharpen the same after it has become dull from use, as the wave line at the rear will act as a gauge, as it was with this standard that the teeth were originally punched and the gauge will always remain the same during the life of the saw. In Fig. 1, I have shown a saw having the holes O therein formed at its opposite ends for fastening purposes, and it will be understood that after the ribbon stock has been made, it may be cut off into any desired length of saw blades. As also previously mentioned, Fig. 1 shows a depth of the wave line exaggerated as well as the distance between the crests, but this is done simply for clearness of illustration, as if made on the actual scale, it would hardly be discernible in a drawing of this size.

From the foregoing, it will be seen that I have produced a saw and the method of making the same wherein the wave will be run throughout the toothed edge and, at the same time, a corresponding wave line will be formed in the rear or upper edge of the saw, so that in punching, setting the teeth, and especially in filing or refiling of the teeth, this wave line in the teeth will always agree with the wave line in the rear edge of the saw. In other words, the wave is a standard and is duplicated on the toothed edge for all times, no matter how often the blade is again filed or resharpened.

It will also be seen that there is no increase of file pressure at the high point in the toothed wave, which has always been the difficulty encountered when filing wave-like teeth in a saw, and it was this condition that removed all traces of the original wave after a few refilings.

The saw per se forms the subject-matter of a divisional application filed June 18, 1931, bearing Serial Number 545,314, for saws.

Having thus described the saw and the preferred method of making the same, what I claim as new and desire to secure by Letters Patent is:

1. The method of making a saw which consists in submitting the upper edge of a steel band to a grinding action to thereby form waves of predetermined length thereon, passing the band through a machine for punching teeth in the lower edge in wave-like formation and using the upper wave as a gauge, setting the teeth using the upper edge as a gauge and filing the teeth and using the upper edge as a gauge.

2. The method of making a saw which consists in temporarily clamping the metal band on a drum, grinding a wave line on the upper edge of the band and the grinding being done in timed relation with the movement of the drum, passing the band through a machine for punching the teeth in a wave-like manner, using the wave in the upper edge as a gauge for the formation of teeth, setting and sharpening the teeth, and the wave in the upper edge of the band also acting as a gauge for these later operations.

3. The method of making a saw which consists in feeding a relatively narrow metal band to a drum, grinding a wave on one edge of the metal band in timed relation to the movement of the band, punching teeth in the opposite edge of the band and in a wave-like manner, setting and filing the teeth, and using the wave on the rear edge of the band as a gauge for the punching, setting and filing of the teeth.

4. The method of making a saw which consists in feeding a metal band to a drum and preventing the slippage of the band as it passes about the drum, grinding a wave on the upper edge of the band and the grinding being done in timed relation to the travel of the band to thereby provide a wave of predetermined length, submitting the band to a punching machine and cutting teeth in the opposite edge of the band and in a wave-like manner corresponding exactly to the wave in the rear of the band, setting the teeth, using the wave on the upper edge of the band as a gauge and submitting the band to a filing machine whereby the band will be raised and lowered with the wave acting as a standard to thereby properly sharpen the said teeth.

5. The method of making a saw which consists in accurately causing a band to travel, grinding a wave-like formation on the upper edge of the band and in timed relation to the movement of said band to thereby form waves of predetermined length, passing the band through a punching machine, using the wave as a guide for the band, to form teeth in the lower edge of the band and in a wave-like formation corresponding to the wave line on the upper edge of the band, moving the band in a tooth by tooth step in a setting machine, using the wave as a guide, and then subjecting the band to a filing action and the wave in the upper edge of the band undulatingly positioning the band to the action of the file.

6. The method of forming a saw from a band of metal stock which consists in cutting a gauge in the upper edge of the band, cutting the teeth in wave-like formation in the lower edge of the saw, and using the gauge as a defining means, sharpening and filing the teeth and also using the gauge in the upper edge of the band for the setting and filing actions.

In testimony whereof I affix my signature
ADOLPH O. SCHAEFER.